(12) United States Patent
Mori et al.

(10) Patent No.: US 7,136,043 B2
(45) Date of Patent: Nov. 14, 2006

(54) LIQUID CRYSTAL DISPLAY FOR VEHICLE

(75) Inventors: Kazuhiko Mori, Saitama (JP); Atsushi Hatayama, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 713 days.

(21) Appl. No.: 10/092,293

(22) Filed: Mar. 7, 2002

(65) Prior Publication Data
US 2002/0135711 A1 Sep. 26, 2002

(30) Foreign Application Priority Data
Mar. 7, 2001 (JP) .............................. 2001-063430

(51) Int. Cl.
G09G 3/36 (2006.01)
G02F 1/133 (2006.01)
H04H 9/00 (2006.01)
H04N 7/16 (2006.01)

(52) U.S. Cl. .................... 345/101; 345/690; 345/87; 349/58; 349/72; 725/12

(58) Field of Classification Search ............... 345/33, 345/34, 35, 38, 48, 50, 87, 101, 690; 349/58, 349/72; 725/12
See application file for complete search history.

(56) References Cited

U.S. PATENT DOCUMENTS

| | | | | |
|---|---|---|---|---|
| 4,464,933 A | * | 8/1984 | Santis ...................... | 73/866.3 |
| 4,556,877 A | * | 12/1985 | Kumagai et al. ............ | 345/214 |
| 5,515,074 A | * | 5/1996 | Yamamoto ................. | 345/101 |
| 5,608,422 A | * | 3/1997 | Ikeda ........................ | 345/101 |
| 5,929,833 A | * | 7/1999 | Koshobu et al. ............ | 345/101 |
| 6,211,852 B1 | * | 4/2001 | Oono et al. ................. | 345/102 |
| 6,313,821 B1 | * | 11/2001 | Mizuno ...................... | 345/101 |
| 6,496,177 B1 | * | 12/2002 | Burton ....................... | 345/101 |

FOREIGN PATENT DOCUMENTS

| | | | |
|---|---|---|---|
| JP | 04001034 A | * | 1/1992 |
| JP | 07270756 A | * | 10/1995 |
| JP | 10-31204 | | 2/1998 |
| WO | WO-91/03759 | | 3/1991 |
| WO | WO-00/02082 | | 1/2000 |
| WO | WO-00/02083 | | 1/2000 |

* cited by examiner

Primary Examiner—Sumati Lefkowitz
Assistant Examiner—Alexander S. Beck
(74) Attorney, Agent, or Firm—Birch, Stewart, Kolasch & Birch, LLP

(57) ABSTRACT

The present invention relates to a liquid crystal display for a vehicle and, particularly, to a liquid crystal display which adjusts liquid crystal drive voltage based on the temperature of a liquid crystal display panel so that the contrast of the liquid crystal display panel is optimum. The display includes a liquid crystal display panel, a circuit board for mounting circuit elements including a liquid crystal driver, a temperature sensor mounted on the circuit board, and a control circuit for controlling liquid crystal drive voltage based on temperature detected by the temperature sensor. The liquid crystal display panel and the circuit board are arranged parallel to each other in a meter housing with a predetermined space therebetween. The display also includes an exposed heat collection panel arranged to surround the screen of the liquid crystal display panel. This configuration provide a liquid crystal display for a vehicle capable of controlling liquid crystal drive voltage accurately without mounting a temperature sensor on the liquid crystal display panel.

18 Claims, 6 Drawing Sheets

LIQUID CRYSTAL DISPLAY FOR VEHICLE

CROSS-REFERENCE TO RELATED APPLICATIONS

The present application claims priority under 35 U.S.C. §119 to Japanese Patent Application No. 2001-063430, filed on Mar. 7, 2001, the entire contents thereof are hereby incorporated by reference.

BACKGROUND OF THE INVENTION

1. Field of the Invention

The present invention relates to a liquid crystal display for a vehicle and, particularly, to a liquid crystal display which adjusts liquid crystal drive voltage based on the temperature of a liquid crystal display panel so that the contrast of the liquid crystal display panel becomes optimum.

2. Description of Background Art

In a liquid crystal display, the contrast of a liquid crystal display panel changes according to an ambient temperature environment even if liquid crystal drive voltage remains the same. Then, Japanese Laid-Open Patent Application No. 10-31204 proposes a liquid crystal display which automatically adjusts liquid crystal drive voltage based on the temperature of the liquid crystal panel detected by a temperature sensor such as a thermistor.

In other words, the contrast of the liquid crystal display is correlated with its temperature. In order for the liquid crystals keep a high contrast between the time when liquid crystals are on in a transparent state, and the time when the liquid crystals are off in a non-transparent state, the drive voltage must be reduced as the temperature of the liquid crystals becomes higher. Therefore, in the above prior art, the ambient temperature of the liquid crystals is detected by a temperature sensor, and a temperature compensation circuit is provided to increase drive voltage when the ambient temperature drops. Likewise, this temperature compensation circuit reduces drive voltage when the ambient temperature rises.

In the above prior art, the temperature of a liquid crystal display panel is represented by the detection temperature of a temperature sensor for detecting the inside temperature of a housing. However, in a liquid crystal display which is often exposed to direct rays of the sun as when it is employed as the meter panel of a motorcycle, a temperature difference occurs between the ambient temperature of the inside of the housing and the actual temperature of the liquid crystal display panel. This makes it difficult to apply the optimum liquid crystal drive voltage. To solve this technical problem, a technology for mounting a temperature sensor to a liquid crystal display panel is also proposed.

However, when the temperature sensor is mounted to the liquid crystal display panel, an electrode for connecting this temperature sensor to a circuit board are newly required, thereby causing technical problems such as an increase in the number of parts or a complicated production process.

SUMMARY AND OBJECTS OF THE INVENTION

It is an object of the present invention to provide a liquid crystal display for vehicle panel which can control liquid crystal drive voltage accurately without mounting a temperature sensor to a liquid crystal display panel.

To attain the above object, according to the present invention, a liquid crystal display for vehicle is provided with a liquid crystal display panel, a circuit board for mounting circuit elements including a liquid crystal driver, a temperature sensor mounted on the circuit board, and a control circuit, mounted on the circuit board, for controlling liquid crystal drive voltage based on the detection temperature of the temperature sensor. The liquid crystal display panel and the circuit board are arranged parallel to each other with a predetermined space therebetween in a meter housing. The display further comprises an exposed heat collecting panel arranged to surround the screen of the liquid crystal display panel.

According to the above feature, when the temperature of the liquid crystal display panel is increased by exposure to sunlight, the inside of the apparatus is heated by the heat collection panel to keep the difference between the ambient temperature in the housing detected by the temperature sensor and the actual temperature of the liquid crystal display panel substantially constant. Therefore, since the temperature of the liquid crystal display panel can be judged accurately based on the detection temperature of the temperature sensor in a high temperature environment in which the appropriate range of liquid crystal drive voltage is narrow, drive voltage can be controlled to the optimum value based on the detection temperature of the temperature sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the liquid crystal display for vehicle according to the present invention will be described in detail with reference to the accompanying drawings.

Figure 8:
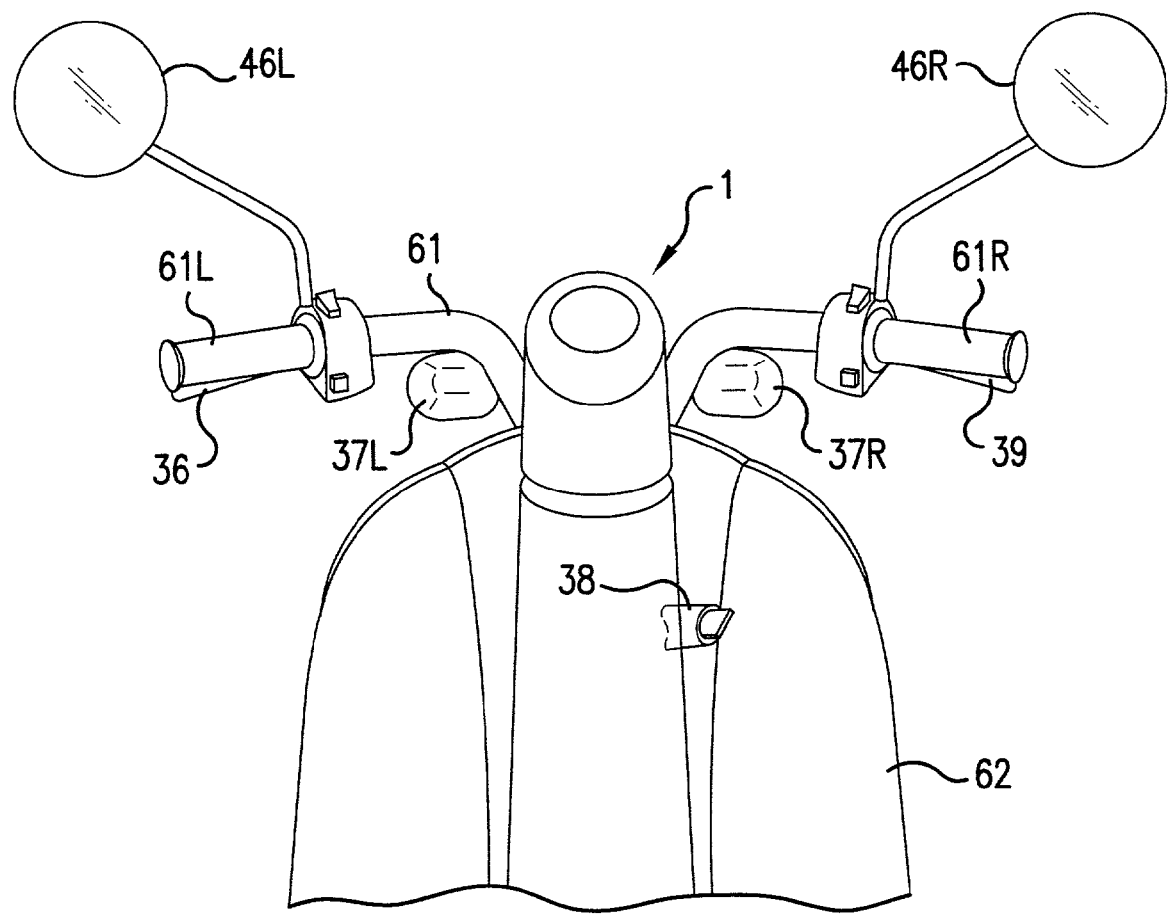
FIG. 8 is a front view of the key section of a motorcycle provided with the liquid crystal display for vehicle of the present invention.

FIG. 8 is a front view of the essential section of a motorcycle provided with the liquid crystal display 1 for vehicle of the present invention. The liquid crystal display 1 for vehicle is mounted to a center portion of a handlebar 61 and winkers 37L and 37R are arranged on right and left sides of the handlebar 61 such that they project from the handlebar 61. On the right side of the vehicle body of a leg shield 62 is arranged a power switch 38 which can be operated by a power key.

A brake lever 39 for front wheels is provided on the right grip 61R of the handlebar 61 and a brake lever 36 for rear wheels is provided on the left grip 61L. Mirrors 46L and 46R are provided on left and right sides of the handlebar 61.

Figure 1:
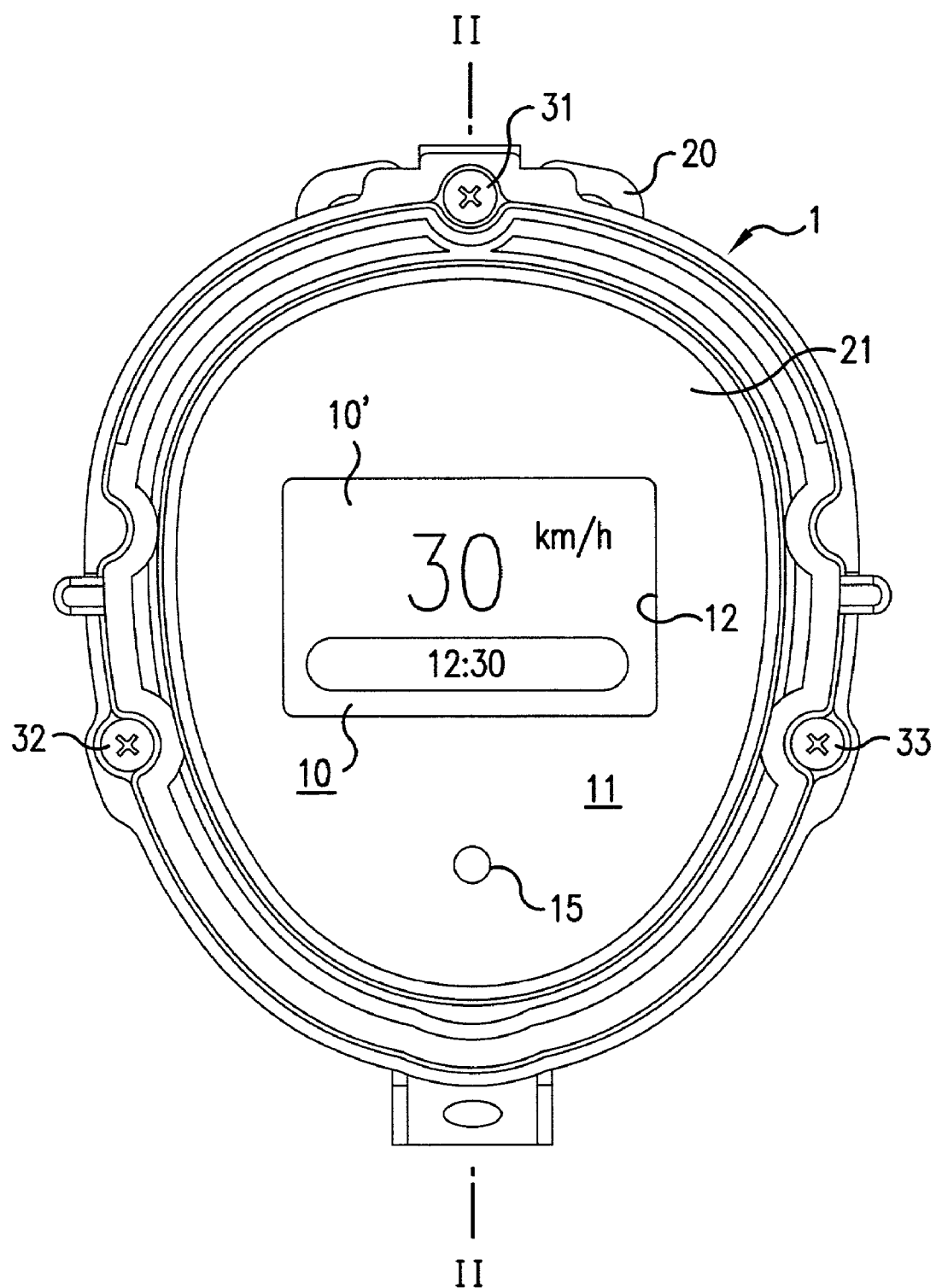
FIG. 1 is a front view of a liquid crystal display for vehicle according to the present invention.
Figure 2:
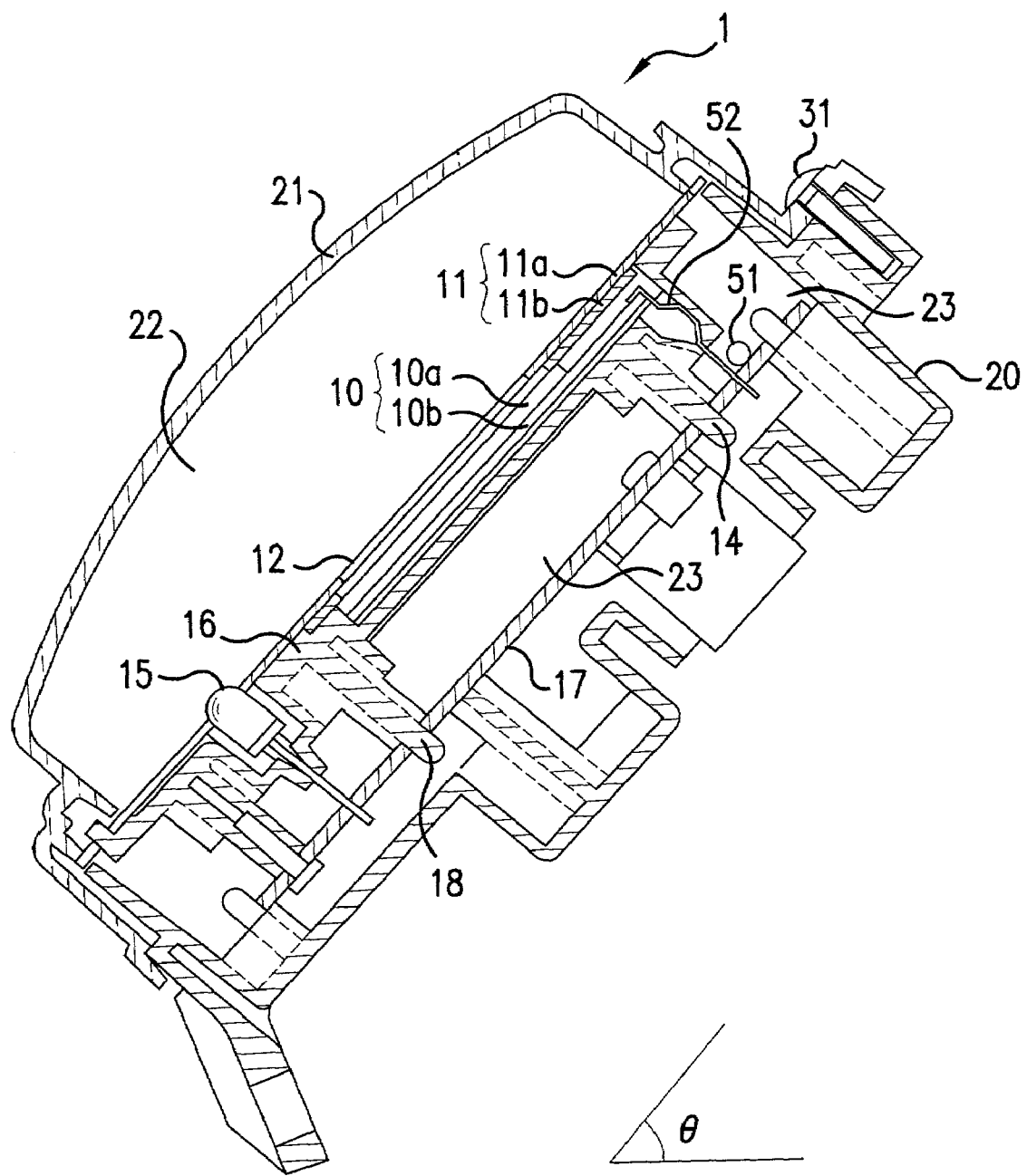
FIG. 2 is a sectional view cut on line II—II of FIG. 1.

FIG. 1 is a front view of the liquid crystal display 1 for vehicle and FIG. 2 is a sectional view cut on line II—II of FIG. 1. Since the liquid crystal display 1 for vehicle of this embodiment is mounted to a vehicle in such a manner that it is inclined at an angle θ in a longitudinal direction, the sectional view of FIG. 2 is inclined at the angle θ.

In this embodiment, an opaque support case 20 and a transparent case cover 21 constitute a housing and both are fixed to each other at three locations by screws 31, 32 and 33. In the housing, a liquid crystal display panel 10 containing liquid crystals sealed up between two glass sheets 10a and 10b is held by a liquid crystal holder 16. Process data such as vehicle speed, engine speed, water temperature and the amount of the residual fuel are displayed on this liquid crystal display panel 10. A heat collection panel 11 having an opening 12 for exposing the screen 10' of the liquid crystal display panel 10 is placed on the exposed side of the liquid crystal display panel 10 to surround the screen 10' of the liquid crystal display panel 10.

The above heat collection panel 11 comprises an opaque resin panel 11a and an adiabatic cushion material 11b mounted on the rear side of the panel 11a to surround the above opening 12. Therefore, the opaque resin panel 11a which is directly exposed to rays of the sun passing through the case cover 21 and the liquid crystal display panel 10 are in contact with each other through the above adiabatic cushion material 11b. Since the above heat collection panel 11 is arranged such that it divides the inside space (see 22, 23 in FIG. 2) of the meter housing, the temperature change rates of the both spaces 22, 23 become equal to each other.

The above liquid crystal holder 16 is placed upright on the circuit board 17 by its leg portions 14 and 18. An illumination LED 15 is placed upright on the circuit board 17 and the end of the light emitting portion of the LED 15 is exposed outward from the opening formed in the heat collection panel 11. Circuit elements such as an LCD driver for driving the liquid crystal display panel 10, LED driver (not shown) for driving the illumination LED 15, temperature sensor 51 for detecting the ambient temperature of the circuit board 17 and temperature detection circuit (not shown) for controlling the above LCD driver based on temperature information detected by the above temperature sensor 51 are mounted on the above circuit board 17. The above liquid crystal display panel 10 and the circuit board 17 are electrically connected by an electrode 52.

Figure 3:
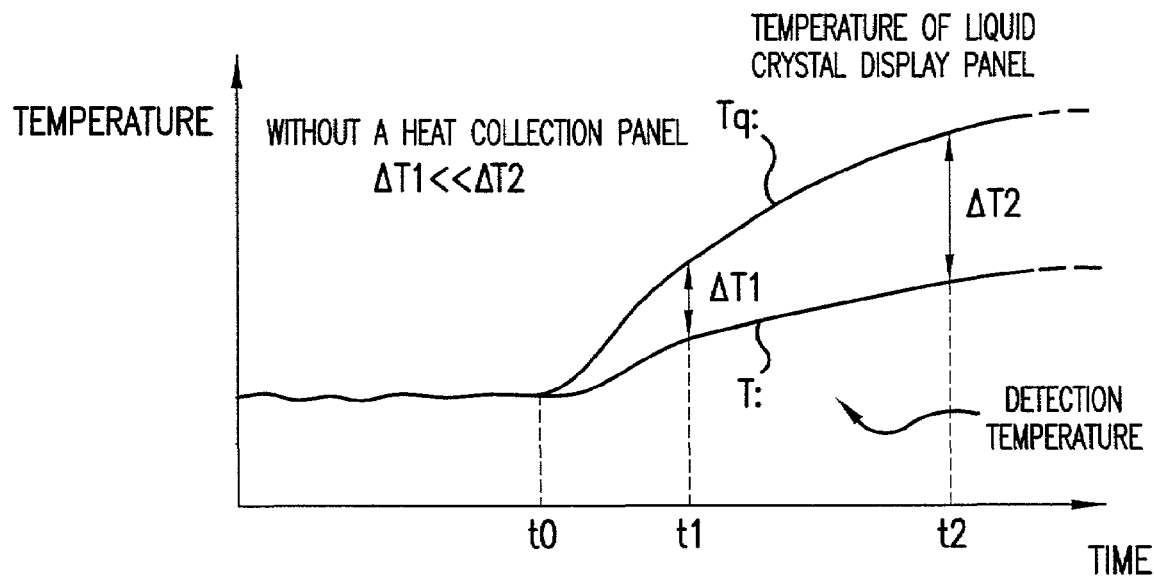
FIG. 3 is a diagram showing the relationship between the temperature Tq of a liquid crystal display panel and temperature T detected by a temperature sensor when a heat collection panel is not provided.
Figure 4:
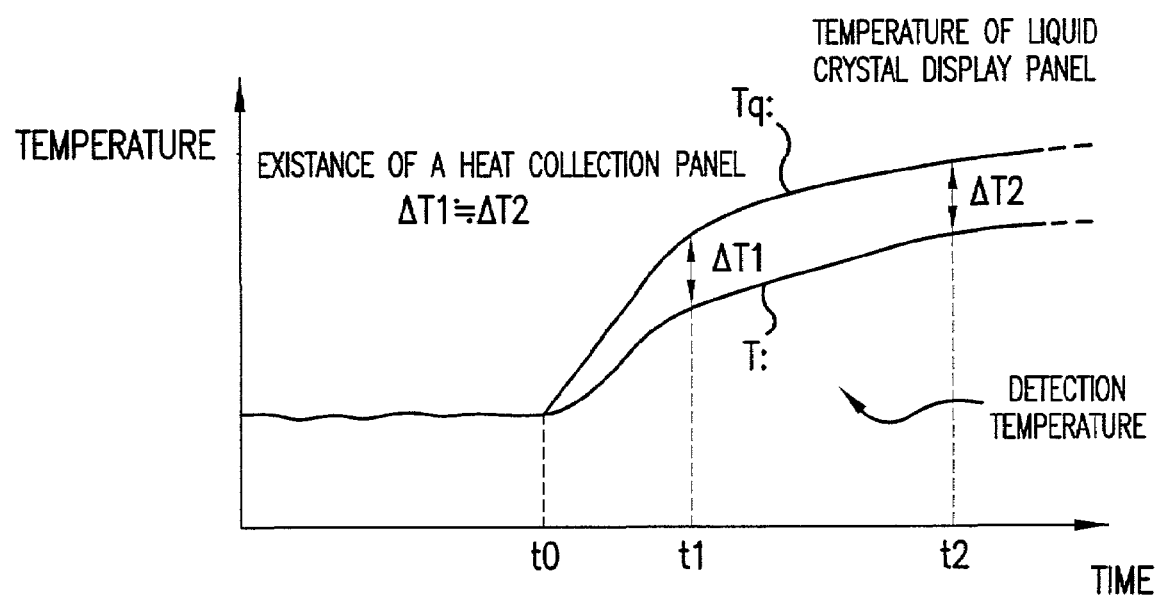
FIG. 4 is a diagram showing the relationship between the temperature Tq of the liquid crystal display panel and temperature T detected by the temperature sensor when the heat collection panel is provided.

FIGS. 3 and 4 show the actual temperature (Tq) of the above liquid crystal display panel 10 and the internal ambient temperature (T) detected by the above temperature sensor 51 when the above heat collection panel 11 is not provided (FIG. 3) and when the panel 11 is provided (FIG. 4).

At night before a time t0 or in the shade, the temperature Tq of the liquid crystal display panel and the detection temperature T are almost equal to each other. In contrast to this, when pseudo sunlight begins to be irradiated at a time t0, the difference between the temperature Tq of the liquid crystal display panel and the detection temperature T becomes larger along the passage of time as shown in FIG. 3 without the heat collection panel 11. Therefore, there is a big difference between the temperature difference ΔT1 at a time t1 and the temperature difference ΔT2 at a time t2.

In contrast to this, since the detection temperature T of the temperature sensor 51 rises in the same manner as the temperature Tq of the liquid crystal display panel as shown in FIG. 4 when the heat collection panel 11 is provided, the difference between the both temperatures remains almost the same regardless of the passage of time. That is, the temperature difference ΔT1 at a time t1 and the temperature difference ΔT2 at a time t2 are almost equal to each other.

Consequently, when the heat collection panel 11 is provided to surround the liquid crystal display panel 10, the actual temperature Tq of the liquid crystal display panel 10 can be judged accurately simply by adding a compensation temperature ΔTadd equivalent to the above temperature difference ΔT1 (=temperature difference ΔT2) to the detection temperature T of the temperature sensor 51.

Further, as air warmed by heat generated by the heat collection panel and circuit elements is convected upward in the housing, the ambient temperature of an upper portion (space 22) has higher follow-up properties to the temperature rise of the liquid crystal display panel 10 than the ambient temperature of a lower portion (space 23). Since the temperature sensor is placed at a high position in space 23 while the liquid crystal display for vehicle is properly mounted on a vehicle in the above described embodiment, the follow-up properties of the detection temperature T to the temperature change of the liquid crystal display panel 10 are improved.

Figure 5:
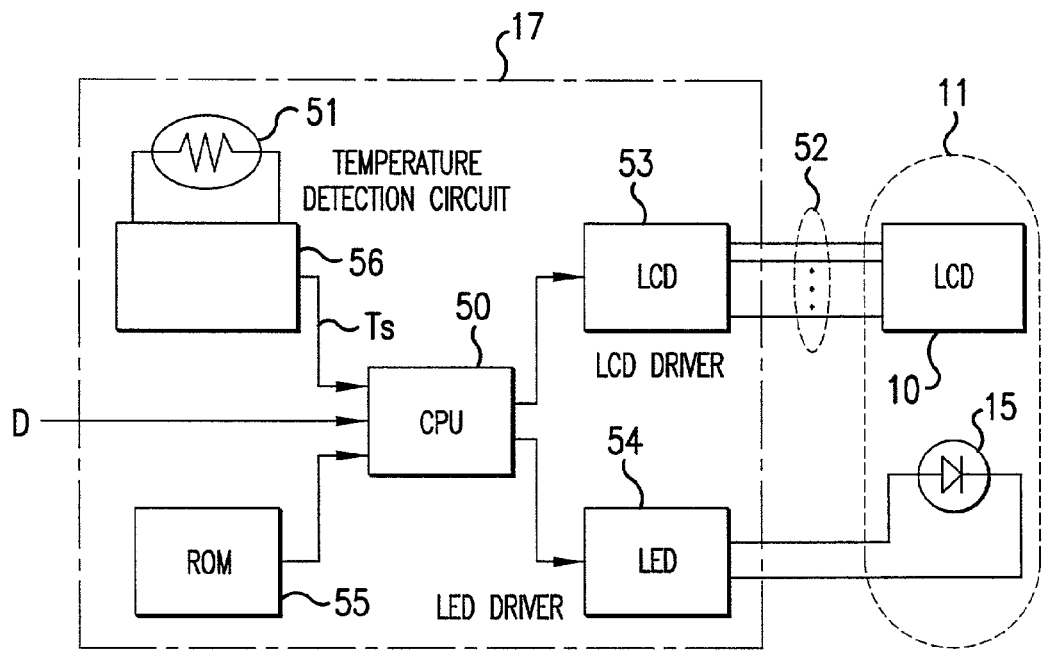
FIG. 5 is a block diagram of the control circuit of the liquid crystal display for vehicle.

FIG. 5 is a block diagram of the control circuit of the above liquid crystal display 1 for vehicle, wherein the same reference numerals as above denote the same or corresponding parts.

An LCD driver 53 supplies a liquid crystal drive signal to the liquid crystal display panel (LCD) 10 in response to an instruction from a CPU 50. The LED driver 54 supplies an LED drive current to an LED 15 in response to an instruction from the CPU 50. A temperature detection circuit 56 converts the resistance value of the temperature sensor 51 (thermistor in this embodiment) into temperature information.

The CPU 50 receives process data D such as vehicle speed and engine speed and outputs their segment data to the LCD driver 53. Control programs and reference values are stored in a ROM 55.

Figure 6:
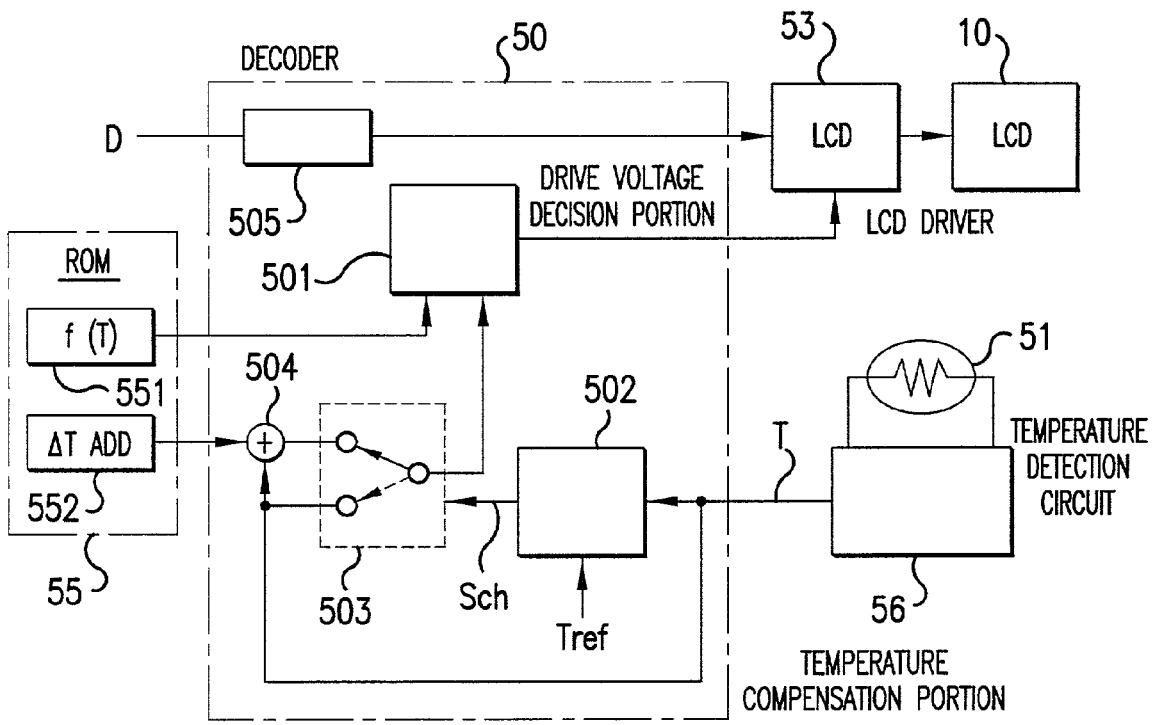
FIG. 6 is a block diagram showing the constitution of the essential section of FIG. 5 functionally.

FIG. 6 is a block diagram showing the constitution of the essential section of the above control circuit functionally, wherein the same reference numerals as above denote the same or corresponding parts.

A function f(T) for controlling LCD drive voltage to an appropriate range based on the detection temperature T of the temperature sensor 51 is registered in the first storage portion 551 of the ROM 55. A compensation temperature ΔTadd equivalent to the difference between the temperature Tq of the liquid crystal display panel and the detection temperature T is registered in the second storage portion 552.

The temperature compensation portion 502 of the CPU 50 outputs a switch signal Sch when the detection temperature T reaches a predetermined reference temperature Tref (45° C. in this embodiment). An adder 504 adds the detection temperature T of the temperature sensor 51 and the above compensation temperature ΔTadd. A switch portion 503 provides the detection temperature T to a drive voltage decision portion 501 when the switch signal Sch is not output from the above temperature compensation portion 502 and provides the total value ΔTadd+T) of the compensation temperature ΔTadd stored in the second storage portion 552 and the detection temperature T to the drive voltage decision portion 501 when the switch signal Sch is output.

A decoder 505 converts the process data D into a segment signal to supply it to the LCD driver 53. The drive voltage decision portion 501 determines LCD drive voltage based on the above function f(T) and temperature information provided from the above switch portion 503 to control the LCD driver 53.

In this constitution, when the detection temperature T of the temperature sensor 51 does not exceed the reference temperature Tref (45° C.), the detection temperature T is selected by the switch portion 503. Therefore, the drive voltage decision portion 501 determines LCD drive voltage based on the function f(T) and the detection temperature T.

In contrast to this, when the detection temperature T of the temperature sensor 51 exceeds the reference temperature Tref, the addition portion 504 is selected by the switch portion 503. Therefore, the drive voltage decision portion 501 determines LCD drive voltage based on the function f(T) and the total temperature (ΔTadd+T).

Figure 7:
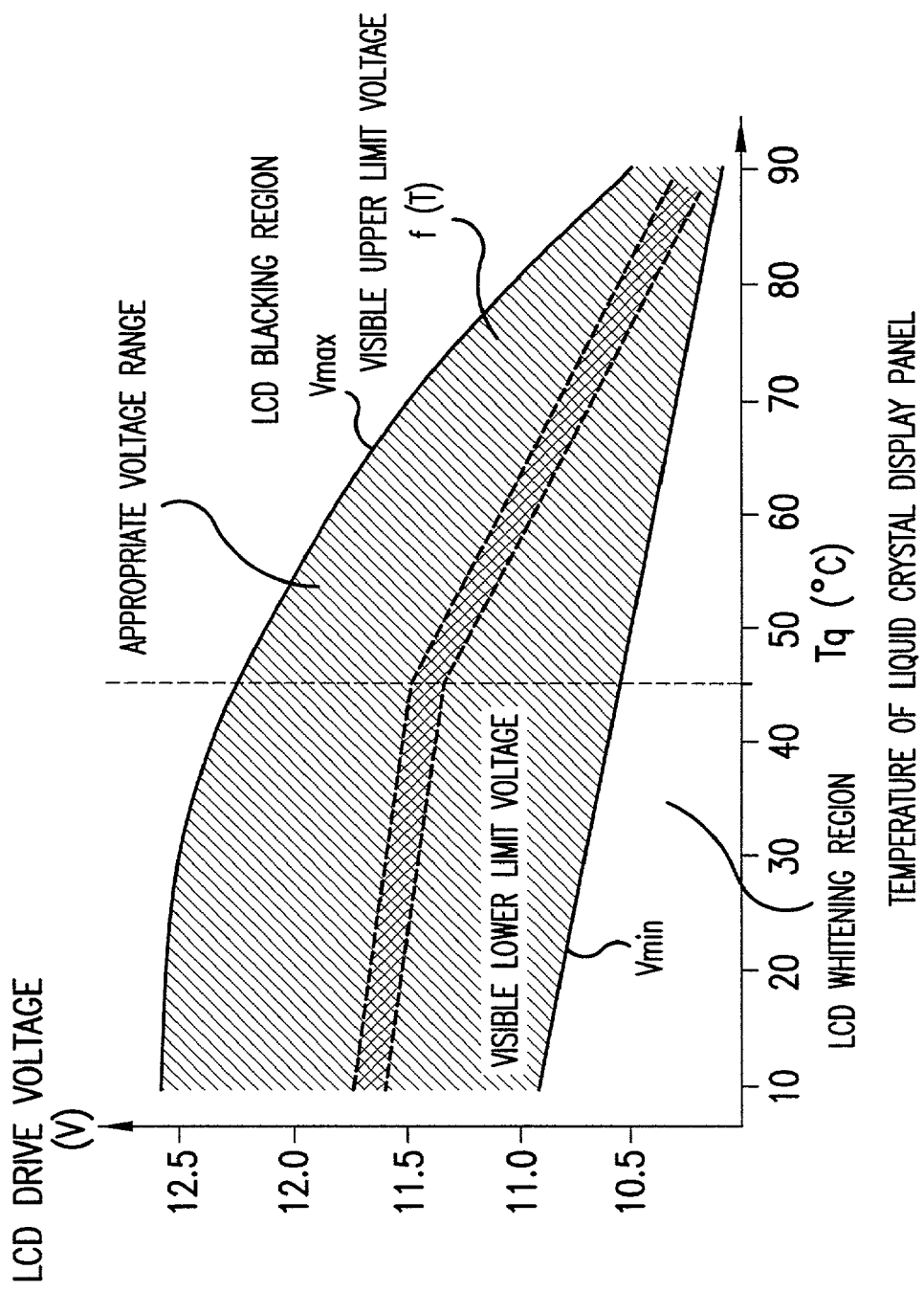
FIG. 7 is a diagram showing the relationship between the temperature of the liquid crystal display panel and liquid crystal drive voltage.

FIG. 7 is a diagram showing the relationship between the temperature Tq of the liquid crystal display panel and LCD drive voltage in this embodiment.

The liquid crystal display panel 10 is blackened when its LCD drive voltage exceeds an appropriate range and whitened when the LCD drive voltage falls below the appropriate range. Although the upper limit voltage Vmax and the lower limit voltage Vmin of the appropriate range fall as the temperature rises, since the reduction rate of the upper limit voltage Vmax is larger than the reduction rate of the lower limit voltage Vmin, the appropriate range of the LCD drive voltage narrows as the temperature of liquid crystals increases.

In contrast to this, as the detection temperature T can represent the temperature Tq of the liquid crystal display panel accurately until the detection temperature T of the temperature sensor 51 exceeds 45° C. in this embodiment as shown in FIG. 4, the LCD drive voltage can be set to an almost intermediate level of the appropriate range based on the above function f(T) and the detection temperature T.

As the total value (T+ΔTadd) of the detection temperature T and the compensation temperature ΔTadd can represent the temperature Tq of the liquid crystal display panel accurately when the detection temperature exceeds 45° C., the LCD drive voltage can be set to an almost intermediate level of the appropriate range based on the above function f(T) and the total value (T+ΔTadd).

The novel combination of elements of the present invention as described above, results in a liquid crystal display that is both accurate and easy to use.

Specifically, a heat collection panel is provided to surround the liquid crystal display panel so that the detection temperature T of the temperature sensor rises, keeping a constant temperature difference from the temperature Tq of the liquid crystal display panel when the temperature Tq of the liquid crystal display panel is increased by exposure to direct rays of the sun. Thus, simply by adding the above temperature difference to the detection temperature T, the temperature Tq of the liquid crystal display panel can be judged accurately based on the detection temperature T of the temperature sensor.

Also, since the temperature sensor is installed at a high position while the liquid crystal display for vehicle is properly mounted slant to a vehicle, the follow-up properties of the detection temperature T to a change in the temperature Tq of the liquid crystal display panel improve. Thus, the temperature Tq of the liquid crystal display panel can be judged more accurately based on the detection temperature T of the temperature sensor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A liquid crystal display for a vehicle comprising:
    a liquid crystal display panel;
    a circuit board for mounting circuit elements including a liquid crystal driver;
    a temperature sensor mounted directly on the circuit board for detecting an ambient temperature of the circuit board; and
    a control circuit, mounted on the circuit board, for controlling liquid crystal drive voltage based on the ambient temperature detected by the temperature sensor,
    the liquid crystal display panel and the circuit board being placed one upon the other in a meter housing having a substantially closed space therein with a predetermined space therebetween, wherein the display further comprises a heat collection panel exposed to surround the screen of the liquid crystal display panel, said heat collection panel divides an inside space of the meter housing where said temperature sensor and said liquid crystal display are mounted, and causes the ambient temperature of said temperature sensor to follow a temperature change of said liquid crystal display panel.

2. The liquid crystal display for a vehicle according to claim 1, wherein the heat collection panel is mounted to the liquid crystal display panel through an adiabatic member.

3. The liquid crystal display for a vehicle according to claim 1, wherein the circuit board is inclined when the liquid crystal display for vehicle is properly mounted to a vehicle and the temperature sensor is installed at a high position above the inclined circuit board.

4. The liquid crystal display for a vehicle according to claim 3, wherein the temperature sensor is installed at a high position in the predetermined space between the meter housing and the circuit board.

5. The liquid crystal display for a vehicle according to claim 1, wherein the temperature sensor is a thermistor.

6. The liquid crystal display for a vehicle according to claim 1, wherein the liquid crystal display is held in place by a liquid crystal holder, the liquid crystal holder being separated from the circuit board by the predetermined space, and held upright on the circuit board by leg portions extending downward from of the liquid crystal display holder to the circuit board.

7. The liquid crystal display for a vehicle according to claim 1, wherein the liquid crystal display panel and the circuit board are parallel to one another.

8. The liquid crystal display for vehicle according to claim 1, wherein the control circuit further comprises:
    a function storage portion for storing a function representing the relationship between the temperature of the liquid crystal display panel and the optimum drive voltage;
    a compensation temperature storage portion for storing a compensation temperature for compensating for a difference between the detection temperature of the temperature sensor and the temperature of the liquid crystal display panel; and a drive voltage decision portion for determining LCD drive voltage based on the function and the temperature of the liquid crystal display panel, the drive voltage decision portion represents the temperature of the liquid crystal display panel by the detection temperature until the detection temperature exceeds a predetermined reference temperature, and represents the temperature of the liquid crystal display panel by the total of the detection temperature and the compensation temperature when the detection temperature exceeds the reference temperature.

9. The liquid crystal display for a vehicle according to claim 8, wherein the predetermined reference temperature is 45° C.

10. A liquid crystal display comprising:

a liquid crystal display panel;

a circuit board for mounting circuit elements including a liquid crystal driver;

a temperature sensor mounted on the circuit board; and a control circuit mounted on the circuit board, the liquid crystal display panel and the circuit board being placed one upon the other in a meter housing having a substantially closed space therein with a predetermined space therebetween, wherein the display further comprising a heat collection panel exposed to surround the screen of the liquid crystal display panel, and the control circuit further comprises an adder circuit for adding a compensation temperature to a temperature detected by the temperature sensor, and outputting a LCD drive voltage which is a function of a sum of these temperatures to the liquid crystal driver when the temperature detected by the temperature sensor exceeds a predetermined reference temperature.

11. The liquid crystal display according to claim 10, wherein the heat collection panel is mounted to the liquid crystal display panel through an adiabatic member.

12. The liquid crystal display according to claim 10, wherein the circuit board is inclined when the liquid crystal display for vehicle is properly mounted to a vehicle and the temperature sensor is installed at a high position above the inclined circuit board.

13. The liquid crystal display according to claim 12, wherein the temperature sensor is installed in a high position in the predetermined space between the meter housing and the circuit board.

14. The liquid crystal display according to claim 10, wherein the temperature sensor is a thermistor.

15. The liquid crystal display according to claim 10, wherein the liquid crystal display panel and the circuit board are parallel to one another.

16. The liquid crystal display according to claim 10, wherein the liquid crystal display is held in place by a liquid crystal holder, the liquid crystal holder being separated from the circuit board by the predetermined space, and held upright on the circuit board by leg portions extending downward from of the liquid crystal display holder to the circuit board.

17. The liquid crystal display according to claim 10, wherein the control circuit further comprises:

a function storage portion for storing a function representing the relationship between the temperature of the liquid crystal display panel and the optimum drive voltage;

a compensation temperature storage portion for storing the compensation temperature, the compensation temperature compensating for a difference between the detection temperature of the temperature sensor and the temperature of the liquid crystal display panel; and a drive voltage decision portion for determining the LCD drive voltage based on the function and the temperature of the liquid crystal display panel, the drive voltage decision portion represents the temperature of the liquid crystal display panel by the detection temperature until the detection temperature exceeds the predetermined reference temperature, and represents the temperature of the liquid crystal display panel by the total of the detection temperature and the compensation temperature when the detection temperature exceeds the reference temperature.

18. The liquid crystal display according to claim 17, wherein the predetermined reference temperature is 45° C.

* * * * *